(12) United States Patent
Mukai

(10) Patent No.: US 10,102,099 B2
(45) Date of Patent: Oct. 16, 2018

(54) PERFORMANCE INFORMATION GENERATING METHOD, INFORMATION PROCESSING APPARATUS AND COMPUTER-READABLE STORAGE MEDIUM STORING PERFORMANCE INFORMATION GENERATION PROGRAM

(71) Applicant: FUJITSU LIMITED, Kawasaki-shi, Kanagawa (JP)

(72) Inventor: Yuta Mukai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 6 days.

(21) Appl. No.: 15/083,342

(22) Filed: Mar. 29, 2016

(65) Prior Publication Data

US 2016/0357655 A1    Dec. 8, 2016

(30) Foreign Application Priority Data

Jun. 2, 2015    (JP) .................................. 2015-112422

(51) Int. Cl.
*G06F 9/44* (2018.01)
*G06F 11/34* (2006.01)
*G06F 8/70* (2018.01)
*G06F 11/30* (2006.01)

(52) U.S. Cl.
CPC ............ *G06F 11/3409* (2013.01); *G06F 8/70* (2013.01); *G06F 11/302* (2013.01)

(58) Field of Classification Search
CPC ............. G06F 11/3407; G06F 11/3447; G06F 11/3466
See application file for complete search history.

(56) References Cited

U.S. PATENT DOCUMENTS

| 6,327,699 | B1 * | 12/2001 | Larus | G06F 11/3612 |
| | | | | 714/E11.209 |
| 2005/0273310 | A1 * | 12/2005 | Newburn | G06F 11/3409 |
| | | | | 703/17 |
| 2005/0283765 | A1 * | 12/2005 | Warren | G06F 11/3409 |
| | | | | 717/131 |
| 2007/0214342 | A1 * | 9/2007 | Newburn | G06F 11/348 |
| | | | | 712/216 |
| 2007/0234299 | A1 | 10/2007 | Watanabe | |
| 2007/0240117 | A1 * | 10/2007 | Wiles | G06F 8/4442 |
| | | | | 717/124 |
| 2008/0177756 | A1 * | 7/2008 | Kosche | G06F 11/3447 |

(Continued)

FOREIGN PATENT DOCUMENTS

| JP | 2004-102594 | 4/2004 |
| JP | 2007-233855 | 9/2007 |
| JP | 2007-304946 | 11/2007 |

*Primary Examiner* — Duy Khuong T Nguyen
(74) *Attorney, Agent, or Firm* — Fujitsu Patent Center

(57) ABSTRACT

A performance information generating method, the method includes: reading, by a computer, context information generated by a context information collection program which performs process while collecting the context information and performance profile information generated by a performance profile information collection program which performs process while collecting the performance profile information; aggregating the performance profile information for each context based on the context information and the performance profile information; and outputting the performance profile information aggregated for each context.

18 Claims, 20 Drawing Sheets

(56) References Cited

U.S. PATENT DOCUMENTS

| | | | |
|---|---|---|---|
| 2009/0037664 A1* | 2/2009 | Kornegay | G06F 12/0888 |
| | | | 711/138 |
| 2009/0055813 A1* | 2/2009 | Haber | G06F 8/4441 |
| | | | 717/158 |
| 2010/0077388 A1* | 3/2010 | Kimura | G06F 11/3466 |
| | | | 717/158 |
| 2010/0115494 A1* | 5/2010 | Gorton, Jr. | G06F 11/3466 |
| | | | 717/128 |
| 2011/0016460 A1* | 1/2011 | Archambault | G06F 8/4442 |
| | | | 717/158 |
| 2012/0311540 A1* | 12/2012 | Fanning | G06F 11/3612 |
| | | | 717/127 |

\* cited by examiner

FIG. 4

```
FunctionA()
{
 ANY PROCESS
}
```

FIG. 5

FROM START TO END OF FunctionA

FIG. 6

```
FunctionA()
{
    SEQUENCE NUMBER = SEQUENCE NUMBER + 1   //CODE TO BE EMBEDDED
    INTEGER ARRAY[SEQUENCE NUMBER] = TOTAL CACHE MISS COUNT AT THIS MOMENT   //CODE TO BE EMBEDDED
    ANY PROCESS
    INTEGER ARRAY[SEQUENCE NUMBER] = TOTAL CACHE MISS COUNT AT THIS MOMENT
        -INTEGER ARRAY[SEQUENCE NUMBER]   //CODE TO BE EMBEDDED
}
```

FIG. 7

```
FunctionA()
{
  SEQUENCE NUMBER = SEQUENCE NUMBER + 1  //CODE TO BE EMBEDDED
  COMPUTE CALL PATH AT THIS MOMENT AND OUTPUT IN CHARACTER STRING FORMAT  //CODE TO BE EMBEDDED
  CHARACTER STRING ARRAY[SEQUENCE NUMBER] = CHARACTER STRING OF CALL PATH AT THIS MOMENT  //CODE TO BE EMBEDDED
  ANY PROCESS
}
```

FIG. 8

```
FunctionA()
{
    SEQUENCE NUMBER = SEQUENCE NUMBER + 1  //CODE TO BE EMBEDDED
    REAL NUMBER ARRAY[SEQUENCE NUMBER] = TIME AT THIS MOMENT  //CODE TO BE EMBEDDED
    ANY PROCESS
    REAL NUMBER ARRAY[SEQUENCE NUMBER] = TIME AT THIS MOMENT
        - REAL NUMBER ARRAY[SEQUENCE NUMBER]  //CODE TO BE EMBEDDED
}
```

FIG. 9

```
FunctionA()
{
  SEQUENCE NUMBER = SEQUENCE NUMBER + 1  //CODE TO BE EMBEDDED
  COMPUTE CHARACTERISTIC VALUE OF ARRAY FOR USE IN COMPUTATION  //CODE TO BE EMBEDDED
  REAL NUMBER ARRAY[SEQUENCE NUMBER] = CHARACTERISTIC VALUE OF ARRAY FOR USE IN COMPUTATION  //CODE TO BE EMBEDDED
  ANY PROCESS
}
```

FIG. 10

| SEQUENCE NUMBER | CACHE MISS COUNT |
|---|---|
| 1 | 10 |
| 2 | 30 |
| 3 | 0 |
| 4 | 50 |
| 5 | 10 |
| 6 | 30 |

FIG. 11

| SEQUENCE NUMBER | CALL PATH |
|---|---|
| 1 | FunctionD → FunctionB → FunctionA |
| 2 | FunctionD → FunctionC → FunctionA |
| 3 | FunctionD → FunctionB → FunctionA |
| 4 | FunctionD → FunctionC → FunctionA |
| 5 | FunctionD → FunctionB → FunctionA |
| 6 | FunctionD → FunctionC → FunctionA |

FIG. 12

| SEQUENCE NUMBER | EXECUTION TIME [$\mu s$] |
|---|---|
| 1 | 10 |
| 2 | 40 |
| 3 | 100 |
| 4 | 20 |
| 5 | 80 |
| 6 | 20 |

FIG. 13

| SEQUENCE NUMBER | CHARACTERISTIC VALUE OF ARRAY |
|---|---|
| 1 | 10% |
| 2 | 50% |
| 3 | 90% |
| 4 | 30% |
| 5 | 70% |
| 6 | 20% |

FIG. 17

| CALL PATH | CACHE MISS COUNT |
|---|---|
| FunctionD → FunctionB → FunctionA | 20 (TOTAL FOR SEQUENCE NUMBERS 1, 3, 5) |
| FunctionD → FunctionC → FunctionA | 110 (TOTAL FOR SEQUENCE NUMBERS 2, 4, 6) |

FIG. 19

| CHARACTERISTIC VALUE SECTION | EXECUTION TIME [$\mu$s] |
|---|---|
| [0,25]% | 30 (TOTAL EXECUTION TIME FOR SEQUENCE NUMBERS 1, 6) |
| [25,50]% | 20 (EXECUTION TIME FOR SEQUENCE NUMBER 4) |
| [50,75]% | 120 (TOTAL EXECUTION TIME FOR SEQUENCE NUMBERS 2, 5) |
| [75,100]% | 100 (EXECUTION TIME FOR SEQUENCE NUMBER 3) |

PERFORMANCE INFORMATION GENERATING METHOD, INFORMATION PROCESSING APPARATUS AND COMPUTER-READABLE STORAGE MEDIUM STORING PERFORMANCE INFORMATION GENERATION PROGRAM

CROSS-REFERENCE TO RELATED APPLICATION

This application is based upon and claims the benefit of priority of the prior Japanese Patent Application No. 2015-112422, filed on Jun. 2, 2015, the entire contents of which are incorporated herein by reference.

FIELD

The embodiment discussed herein is related to a performance information generating method, information processing apparatus, and computer-readable storage medium storing a performance information generation program therein.

BACKGROUND

By executing a program, performance profile information such as execution time for a portion of the program and a cache miss count is collected.

Related art is disclosed in Japanese Laid-open Patent Publication No. 2007-233855, 2004-102594, or 2007-304946.

SUMMARY

According to an aspect of the embodiments, a performance information generating method, the method includes: reading, by a computer, context information generated by a context information collection program which performs process while collecting the context information and performance profile information generated by a performance profile information collection program which performs process while collecting the performance profile information; aggregating the performance profile information for each context based on the context information and the performance profile information; and outputting the performance profile information aggregated for each context.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 depicts an example of a source code;

FIG. 5 depicts an example of range specification;

FIG. 6 depicts an example of a performance profile collection code;

FIG. 7 depicts an example of a context collection code;

FIG. 8 depicts an example of the performance profile collection code;

FIG. 9 depicts an example of the context collection code;

FIG. 10 depicts an example of performance profile information;

FIG. 11 depicts an example of context information;

FIG. 12 depicts an example of the performance profile information;

FIG. 13 depicts an example of the context information;

FIG. 17 depicts an example of a cache miss count for each call path;

FIG. 19 depicts an example of execution time for each characteristic value section.

DESCRIPTION OF EMBODIMENT

When performance profile information is collected, for example, performance profile information may be collected for each context, while portions are identical in terms of source code. Context relates to performance with which profile information is collected, and represents a state of a computing machine determined at the time of execution.

For example, the context includes a call path following a routine of a caller to a portion where performance profile information is collected, a characteristic value of the value of an array for use in computation, and so forth. With performance profile information being collected for each context, valid performance tuning may be performed, or performance investigation time may be shortened.

Figure 1:
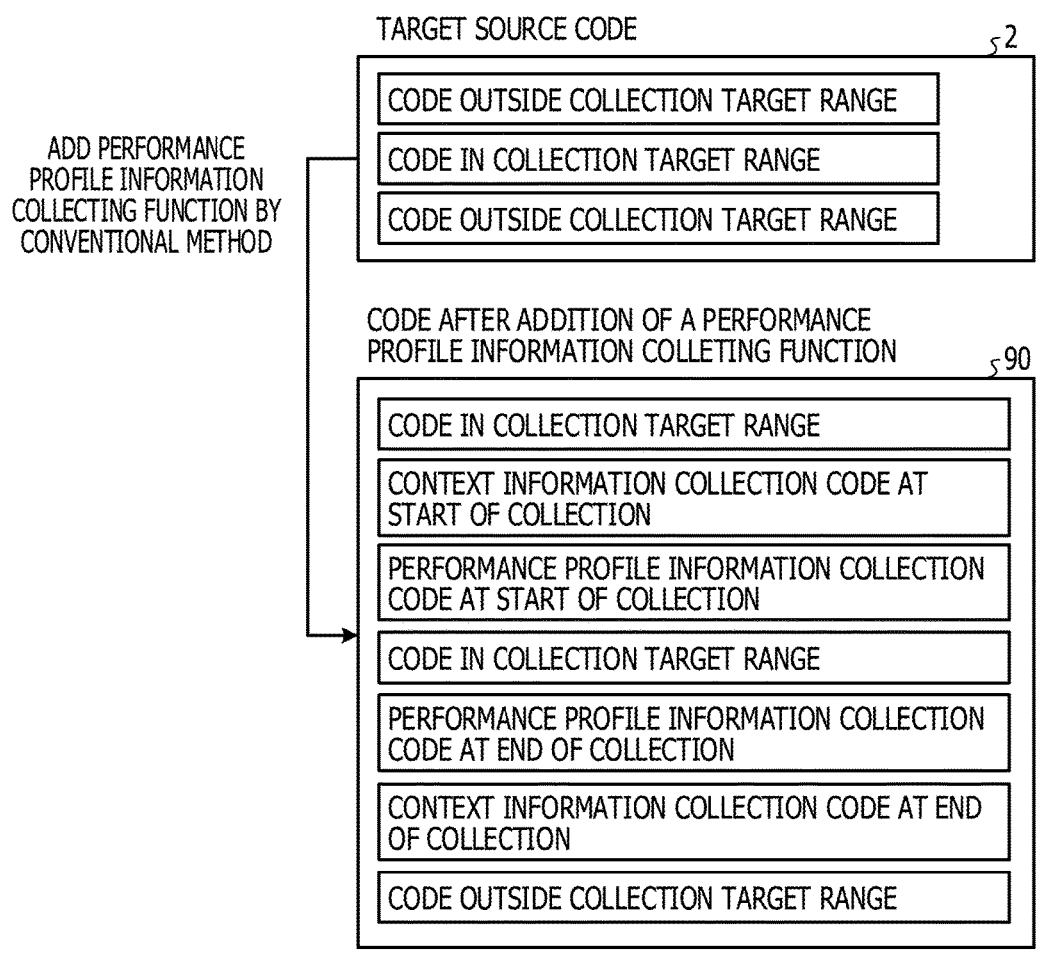
FIG. 1 depicts a drawing for explaining a way for collecting performance profile information for each context according to related art.

FIG. 1 depicts a drawing for explaining a way for collecting performance profile information for each context according to related art. As depicted in FIG. 1, a collection-target source code 2 of the performance profile information includes a code in a collection target range and codes outside the collection target range. The collection target code is interposed between the codes outside the collection target range.

A collection-function-added code 90 after addition of a performance profile information collecting function includes a collection-purpose code, in addition to a code in the collection target range and codes outside the collection target range. The collection-purpose code includes a context information collection code at the start of collection, a performance profile information collection code at the start of collection, a performance profile information collection code at the end of collection, and a context information collection code at the end of collection.

Immediately before the code in the collection target range is executed, the context information collection code at the start of collection and the performance profile information collection code at the start of collection are executed. Immediately after the code in the collection target range is executed, the performance profile information collection code at the end of collection and the context information collection code at the end of collection are executed.

For example, based on information in which performance information, a measurement condition, and the next measurement condition are managed in a linkable manner, a next measurement environment is automatically set, thereby efficiently performing performance tuning.

For example, the number of times of execution is measured for each concurrent execution unit of a concurrent execution program, the measurement results are analyzed, and the analysis results indicating load distribution in concurrent execution are outputted, thereby supporting tuning of the concurrent execution program.

For example, a performance analysis code is embedded in a program, association with program operation is made by observing the state of a processor bus, and the result is transferred after the end of process to a host computing machine, thereby performing performance analysis without using special hardware.

In collection of performance profile information for each context depicted in FIG. 1, context information and performance profile information are simultaneously collected. Therefore, the performance may be changed compared with the case of not collecting context information. This may degrade accuracy of performance profile information.

Figure 2:
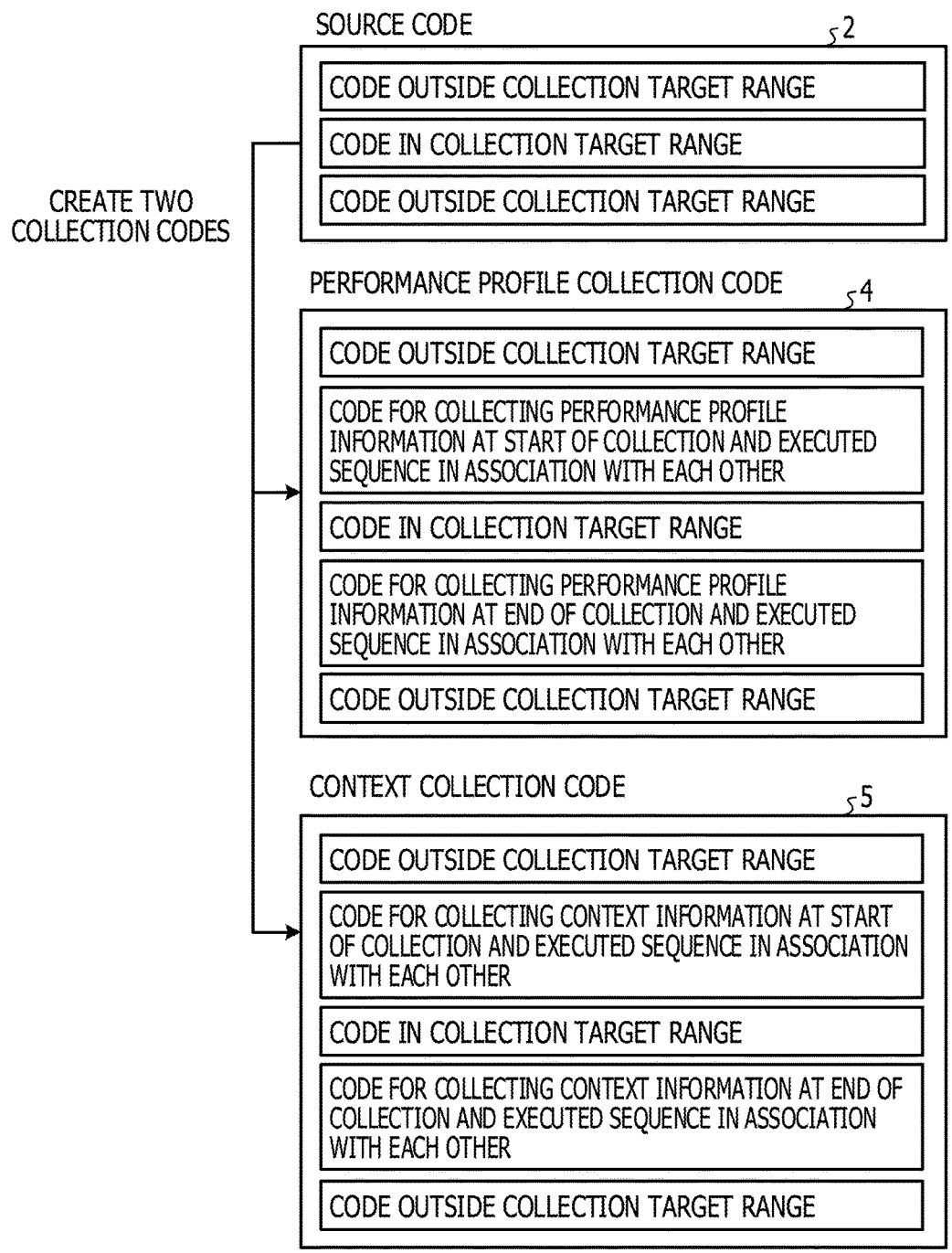
FIG. 2 depicts a drawing for explaining a way for collecting performance profile information for each context according to an embodiment.

FIG. 2 depicts a drawing for explaining a way for collecting performance profile information for each context according to an embodiment. The performance profile information for each context depicted in FIG. 2 may be collected by an information processing apparatus. As depicted in FIG. 2, from the target source code 2, the information processing apparatus creates a performance profile collection code 4 and a context collection code 5. The performance profile collection code 4 may be a code having added thereto a function of sequencing and collecting only performance profile information. The context collection code 5 may be a code having added thereto a function of sequencing and collecting only context information.

The performance profile collection code 4 includes a code for collecting performance profile information, in addition to a code in a collection target range and codes outside the collection target range. The code for collecting performance profile information includes a code for collecting performance profile information at the start of collection in association with the execution sequence and a code for collecting performance profile information at the end of collection in association with the execution sequence.

In execution of the performance profile collection code 4, immediately before the code in the collection target range is executed, the code for collecting performance profile information at the start of collection in association with the execution sequence is executed. Immediately after the code in the collection target range is executed, the code for collecting performance profile information at the end of collection in association with the execution sequence is executed.

The context collection code 5 includes a code for collecting context information, in addition to a code in the collection target range and codes outside the collection target range. The code for collecting context information includes a code for collecting context information at the start of collection in association with the execution sequence and a code for collecting context information at the end of collection in association with the execution sequence.

In execution of the context collection code 5, immediately before the code in the collection target range is executed, the code for collecting context information at the start of collection in association with the execution sequence is executed. Immediately after the code in the collection target range is executed, the code for collecting context information at the end of collection in association with the execution sequence is executed.

Based on the result of sequencing and collecting only the performance profile information and the result of sequencing and collecting only the context information, the information processing apparatus aggregates performance profile information for each context. Based on the sequence, the information processing apparatus performs aggregation from the performance profile information and the context information for each sequence of execution in a measurement target range.

In this manner, since the information processing apparatus measures the performance profile information with only the operation of collecting performance profile information being added, high-accuracy performance profile information may be obtained for each context.

For example, the performance profile information to be collected may be a cache miss count, and the context information may be a call path. When the cache miss count is collected, the call path is also collected. Therefore, an element pushed out from a cache with call path collection may be read again into the cache within a measurement range. For example, a cache miss may occur. A value more excessive than a cache miss count occurring in a normal executing method without collecting performance profile information may be measured.

In call path collection, the address of each caller or the like is read. However, since storage locations on memory corresponding to the respective addresses of the callers are often noncontiguous, elements at least as much as the length of the call path may be pushed out with collection. As a result, the cache miss count may be excessively measured as much as the length of the call path For example, because of being obtained by a predetermined collecting method with less overheads, such as a method of collecting only a cache miss count, the cache miss count may have a value closest to the cache miss count occurring in the normal execution method without collecting performance profile information.

For example, the performance profile information to be collected may be execution time, and the context information may be a characteristic value of an array for use in computation. The characteristic value useful for performance analysis may include, for example, a ratio of a value for branching an array in a certain direction, the array for which a branching direction for each iteration is to be determined regarding branching in a loop. To compute this characteristic value, all array elements are accessed. Therefore, the use status of a cache memory is changed compared with a use status in normal execution, and the execution time may be significantly influenced. Therefore, by aggregating the results obtained by collecting the execution time and the characteristic value of the array separately, the information processing apparatus may obtain execution time close to execution time in normal execution.

Figure 3:
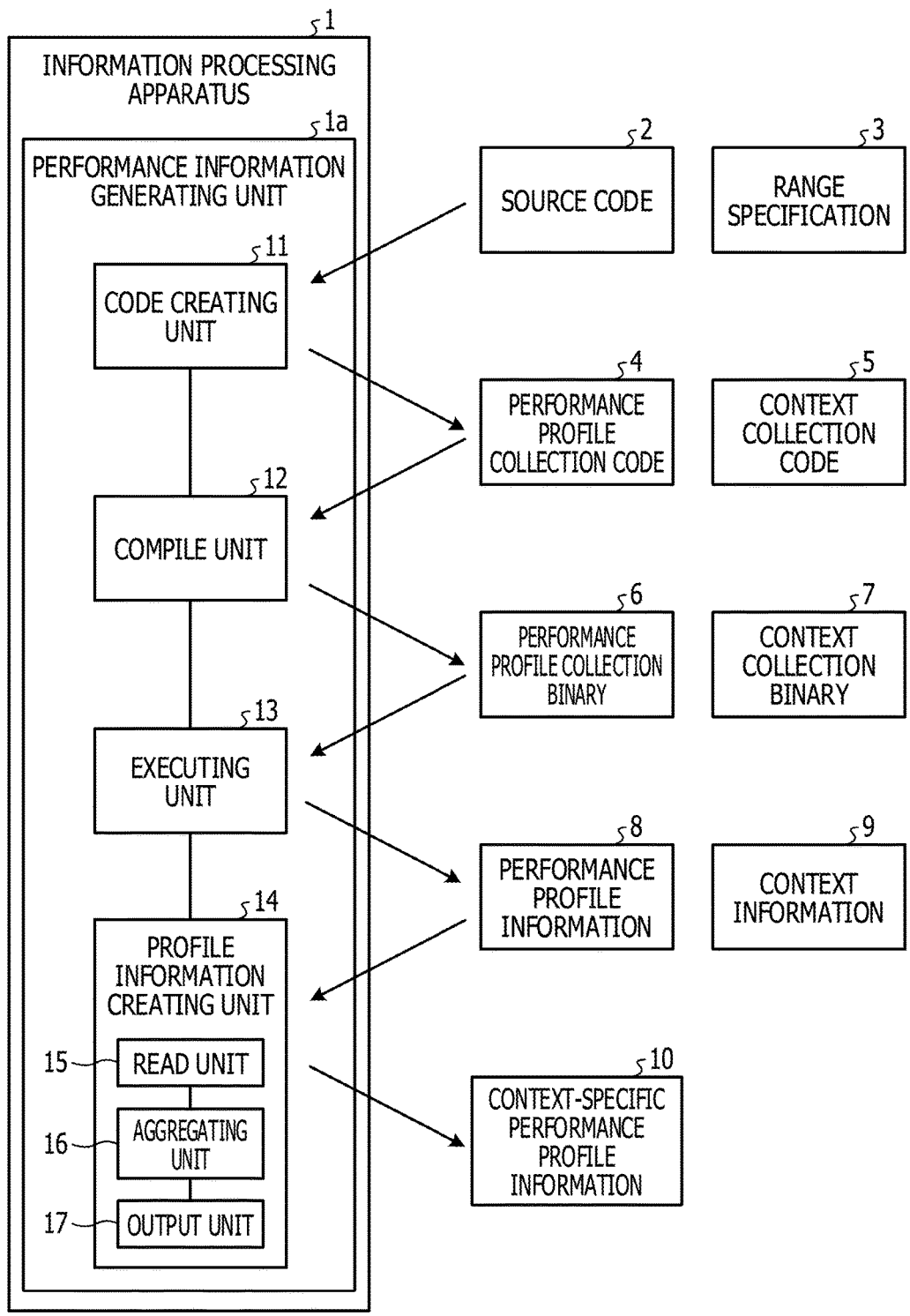
FIG. 3 depicts an example of functional structure of an information processing apparatus.

FIG. 3 depicts an example of functional structure of the information processing apparatus. As depicted in FIG. 3, an information processing apparatus 1 has a performance information generating unit 1a. The performance information generating unit is generates performance profile information for each context. The performance information generating unit 1a has a code creating unit 11, a compile unit 12, an executing unit 13, and a profile information creating unit 14.

Figure 4:
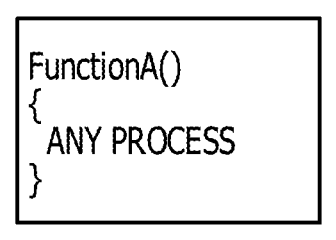

The code creating unit 11 receives inputs of a source code 2 and range specification 3, and creates and outputs a performance profile collection code 4 and a context collection code 5. FIG. 4 depicts an example of the source code. In FIG. 4, function A (FunctionA) is depicted as an example of the source code 2.

In the range specification 3, a range in which performance profile information is collected is specified in the source code 2. FIG. 5 depicts an example of the range specification. In FIG. 5, a specification from the start to the end of function A is depicted as an example of the range specification 3.

FIG. 6 depicts an example of the performance profile collection code. In FIG. 6, the case is depicted in which a code for sequencing and collecting cache miss counts is embedded before and after the process of function A. In FIG. 6, "SEQUENCE NUMBER=SEQUENCE NUMBER+1" is a code embedded to update a sequence number, which is a number for sequencing every time function A is executed. "INTEGER ARRAY[SEQUENCE NUMBER]=TOTAL CACHE MISS COUNT AT THIS MOMENT" is a code embedded to store a cache miss count at the start of collection in an integer array, which is an array for storing the cache miss count, with the sequence number taken as an index. "INTEGER ARRAY[SEQUENCE NUMBER]=TOTAL CACHE MISS COUNT AT THIS MOMENT−INTEGER ARRAY[SEQUENCE NUMBER]" is a code embedded to store cache miss counts from the start to end of function A in the integer array, with the sequence number taken as an index.

FIG. 7 depicts an example of the context collection code. In FIG. 7, the case is depicted in which a code for sequencing and collecting a call path is embedded before the process of function A. In FIG. 7, since the call path is not changed before and after the process of function A, embedment of a code for collecting a call path after the process of function A may be omitted. In FIG. 7, "COMPUTE CALL PATH AT THIS MOMENT AND OUTPUT IN CHARACTER STRING FORMAT" is a code embedded to create a character string representing a call path, and "CHARACTER STRING ARRAY[SEQUENCE NUMBER]=CHARACTER STRING OF CALL PATH AT THIS MOMENT" is a code embedded to store a character string representing the call path in a character string array, which is an array for storing a call path, with the sequence number taken as an index.

FIG. 8 depicts an example of the performance profile collection code. In FIG. 8, the case is depicted in which a code for sequencing and collecting execution time is embedded before and after the process of function A. In FIG. 8, "REAL NUMBER ARRAY[SEQUENCE NUMBER]=TIME AT THIS MOMENT" is a code embedded to store execution time at the start of collection in a real number array, which is an array for storing execution time, with the sequence number taken as an index. "REAL NUMBER ARRAY[SEQUENCE NUMBER]=TIME AT THIS MOMENT−REAL NUMBER ARRAY[SEQUENCE NUMBER]" is a code embedded to store execution time from the start to end of function A in the real number array, with the sequence number taken as an index.

FIG. 9 depicts an example of the context collection code. In FIG. 9, the case is depicted in which a code for sequencing and collecting characteristic values of an array is embedded before the process of function A. In FIG. 9, since the characteristic value of the array is not changed before and after the process of function A, embedment of the code for collecting a characteristic value of the array after the process of function A may be omitted. In FIG. 9, "COMPUTE CHARACTERISTIC VALUE OF ARRAY FOR USE IN COMPUTATION" is a code embedded to compute a characteristic value of the array for use in computation, and "REAL NUMBER ARRAY[SEQUENCE NUMBER]=CHARACTERISTIC VALUE OF ARRAY FOR USE IN COMPUTATION" is a code embedded to store in a real number array, which is an array for storing a characteristic value of the array for use in computation, with the sequence number taken as an index. For example, the characteristic value may be a real number from 0 to 1, and execution time is allocated to each section obtained by equally dividing from 0 to 1 into four.

The compile unit 12 of FIG. 3 receives an input of the performance profile collection code 4 to compile, and outputs a performance profile collection binary 6. The compile unit 12 receives an input of the context collection code 5 to compile, and outputs a context collection binary 7.

The executing unit 13 receives an input of the performance profile collection binary 6 and executes this binary, and outputs performance profile information 8. The executing unit 13 receives an input of the context collection binary 7 and executes this binary, and outputs context information 9. FIG. 10 depicts an example of the performance profile information. In FIG. 10, the performance profile information 8 collected by execution of the performance profile collection code 4 depicted in FIG. 6 is depicted. As depicted in FIG. 10, the performance profile information 8 is information with the sequence number and the cache miss count associated with each other. For example, when the sequence number is 1, the cache miss count from the start to end of function A may be 10.

FIG. 11 depicts an example of the context information. In FIG. 11, the context information 9 collected with execution of the context collection code 5 depicted in FIG. 7 is depicted. As depicted in FIG. 11, the context information 9 is information with the sequence number and the call path associated with each other. For example, when the sequence number is 1, function D calls function B, and function B calls function A.

FIG. 12 depicts an example of the performance profile information. In FIG. 12, the performance profile information 8 collected with execution of the performance profile collection code 4 depicted in FIG. 8 is depicted. As depicted in FIG. 12, the performance profile information 8 is information with the sequence number and the execution time associated with each other. The unit of the execution time is microseconds (μs). For example, when the sequence number is 1, the execution time from the start to end of function A may be 10 μs.

FIG. 13 depicts an example of the context information. In FIG. 13, the context information 9 collected with execution of the context collection code 5 depicted in FIG. 9 is depicted. As depicted in FIG. 13, the context information 9 is information with the sequence number and the characteristic value of the array associated with each other. In FIG. 13, the characteristic value is in % display. For example, when the sequence number is 1, the characteristic value of the array may be 10%.

In FIG. 3, the profile information creating unit 14 receives inputs of the performance profile information 8 and the context information 9, and creates and outputs context-specific performance profile information 10. The profile information creating unit 14 includes a read unit 15, an aggregating unit 16, and an output unit 17.

The read unit 15 reads the performance profile information 8 and the context information 9. The aggregating unit 16 creates the context-specific performance profile information 10 based on the performance profile information 8 and the context information 9. The output unit 17 outputs the context-specific performance profile information 10 into a file.

Figure 14:
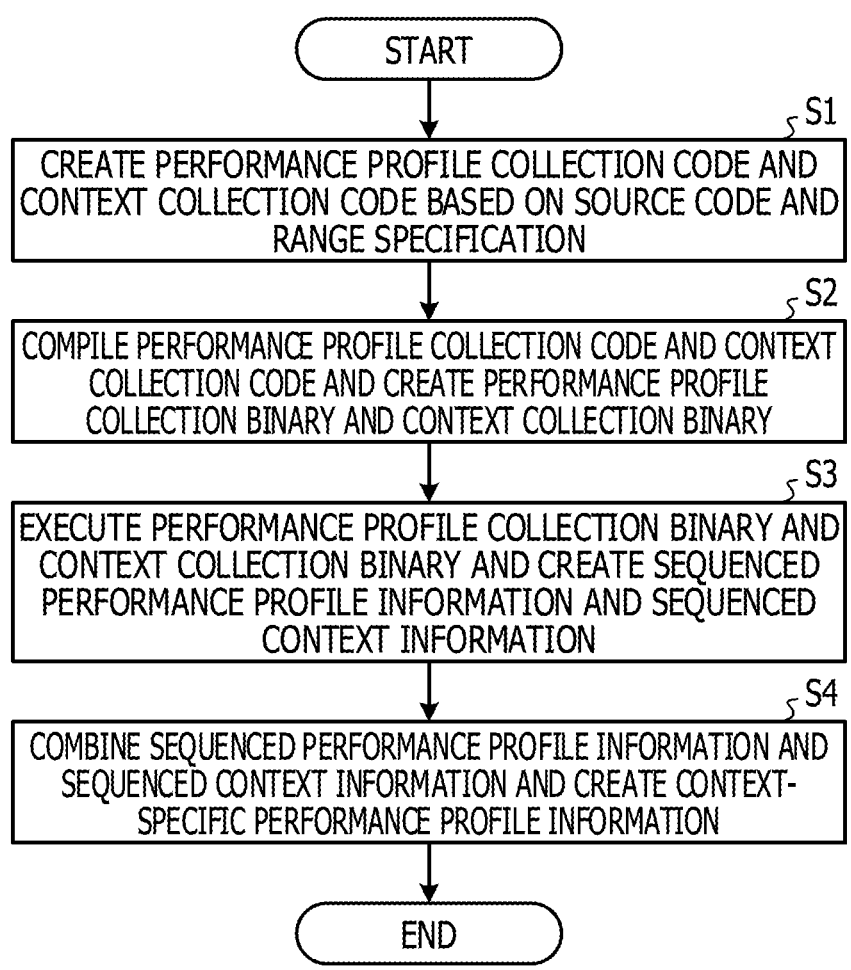
FIG. 14 depicts an example of process of collecting context-specific performance profile information.

FIG. 14 depicts an example of process of collecting the context-specific performance profile information. The collecting process depicted in FIG. 14 may be performed by the information processing apparatus 1 depicted in FIG. 3. As depicted in FIG. 14, the code creating unit 11 creates the performance profile collection code 4 and the context collection code 5 based on the source code 2 and the range specification 3 (operation S1).

The compile unit 12 compiles the performance profile collection code 4 and the context collection code 5, and creates the performance profile collection binary 6 and the context collection binary 7 (operation S2). The executing unit 13 executes each of the performance profile collection binary 6 and the context collection binary 7, and creates the sequenced performance profile information 8 and the sequenced context information 9 (operation S3).

The profile information creating unit 14 combines the sequenced performance profile information 8 and the sequenced context information 9, and creates the context-specific performance profile information 10 (operation S4).

Since the information processing apparatus 1 separately collects the sequenced performance profile information 8 and the sequenced context information 9, degradation of accuracy of the performance profile information 8 may be decreased.

Figure 15:
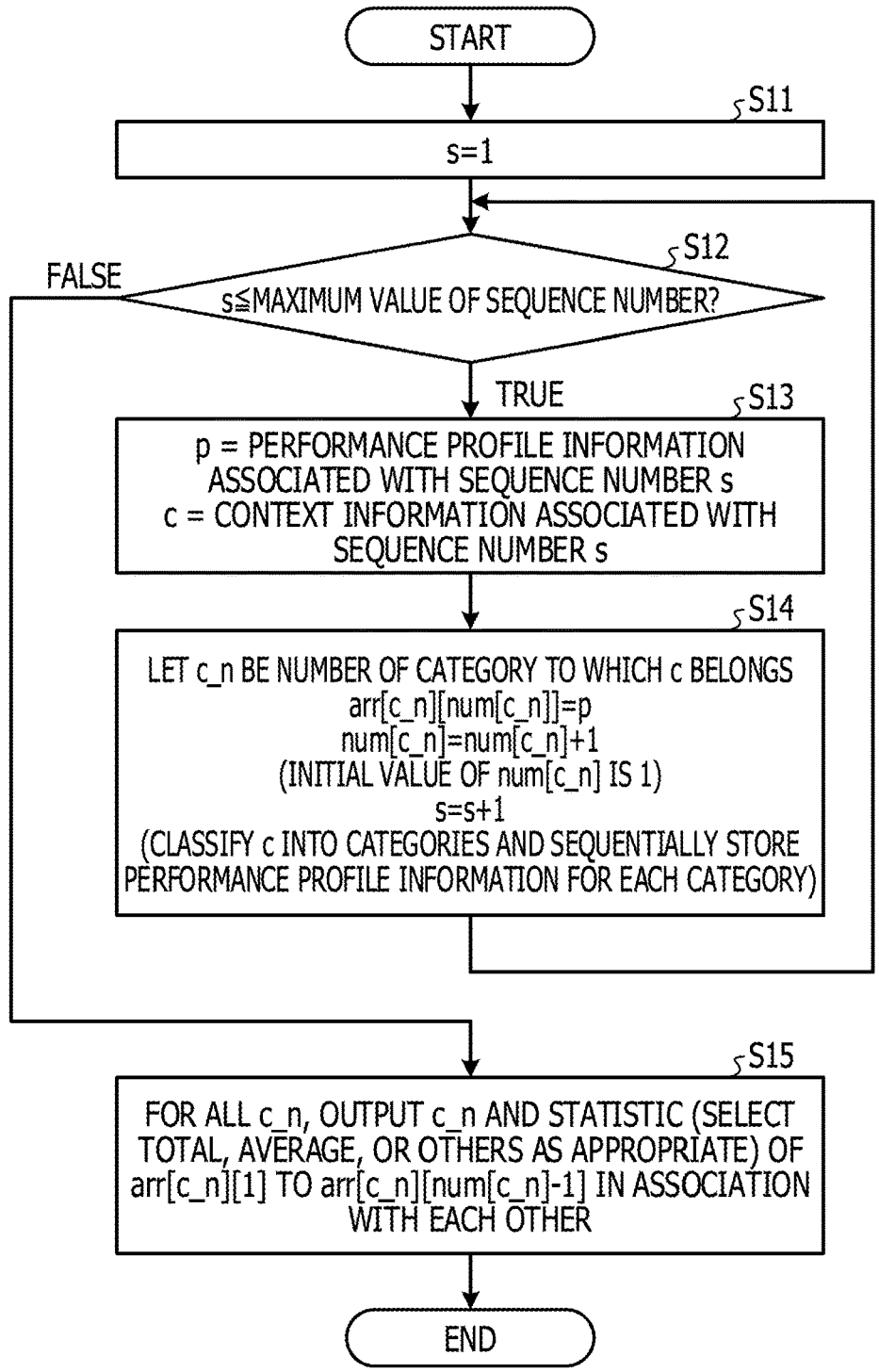
FIG. 15 depicts an example of process of creating context-specific performance profile information.

FIG. 15 depicts an example of process of creating context-specific performance profile information. The process depicted in FIG. 15 may correspond to operation S4 depicted in FIG. 14.

As depicted in FIG. 15, the profile information creating unit 14 initializes s indicating a sequence number during process with 1 (operation S11) to determine whether s is equal to or smaller than a maximum value of the sequence number (operation S12).

When s is equal to or smaller than the maximum value of the sequence number, the profile information creating unit 14 sets performance profile information associated with the sequence number s as p, and sets context information associated with the sequence number s as c (operation S13).

The profile information creating unit 14 takes c_n as a category number to which the value of c belongs, stores p in arr[c_n][num[c_n]], adds 1 to num[c_n], and adds 1 to s (operation S14), where arr is an array for storing the performance profile information 8 for each category, and num[c_n] is an index of the performance profile information 8 for each category and has an initial value of 1. For example, the profile information creating unit 14 classifies c into categories, and sequentially stores the performance profile information 8 for each category. The process then returns to operation S12.

When s is not equal to or smaller than the maximum value of the sequence number, the profile information creating unit 14 outputs, for all c_n, a c_n and a statistic of arr[c_n][1] to arr[c_n][num[c_n]−1] in association with each other (operation S15). The statistic may be, for example, a total value, an average value, or the like.

In this manner, the profile information creating unit 14 may combine the sequenced performance profile information 8 and the sequenced context information 9, thereby creating the context-specific performance profile information 10.

Figure 16:
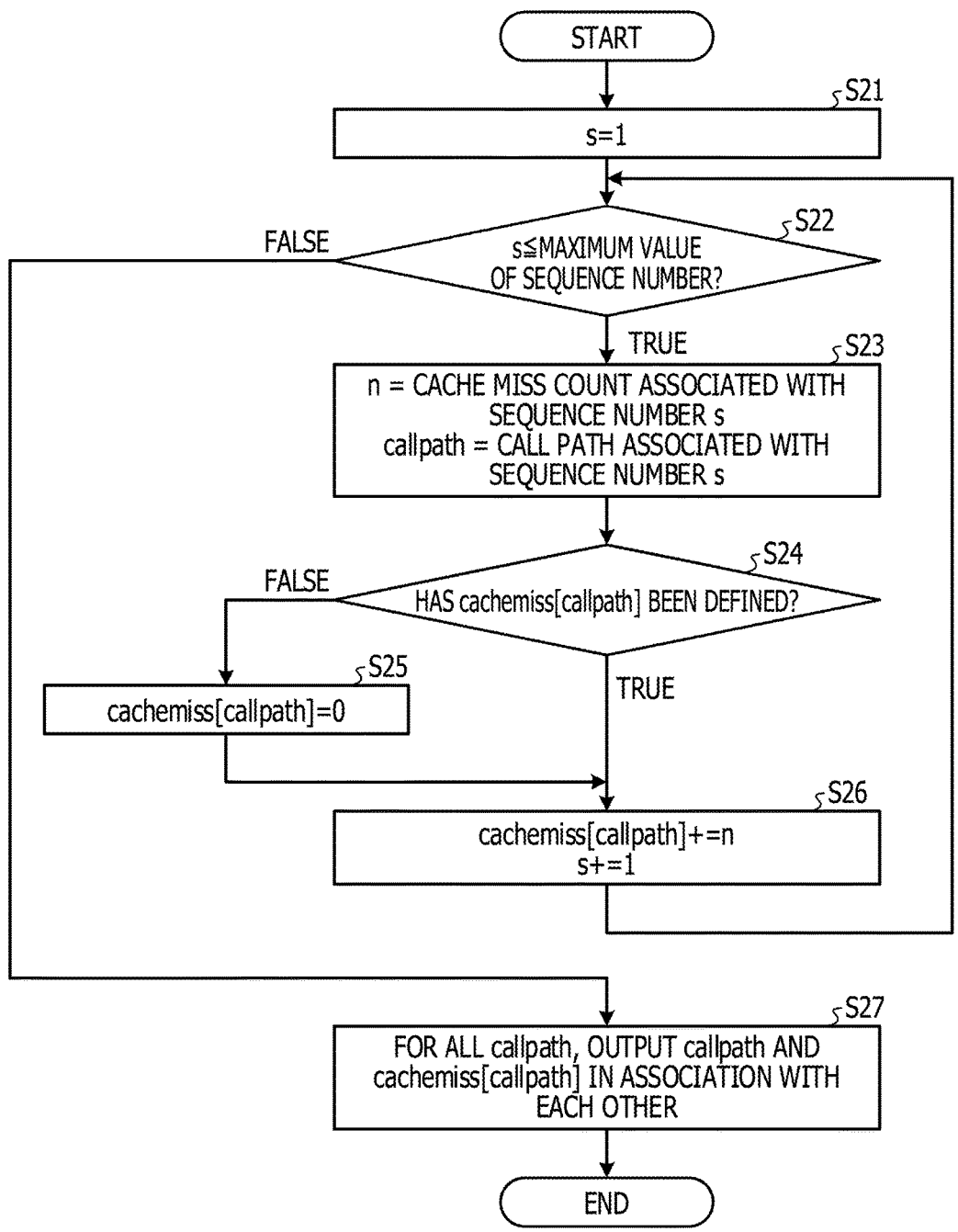
FIG. 16 depicts an example of aggregating cache miss counts.

FIG. 16 depicts an example of process of aggregating cache miss counts. In FIG. 16, cache miss counts may be aggregated for each call path.

As depicted in FIG. 16, the profile information creating unit 14 initializes s indicating a sequence number during process with 1 (operation S21), and determines whether s is equal to or smaller than the maximum value of the sequence number (operation S22).

When s is equal to or smaller than the maximum value of the sequence number, the profile information creating unit 14 sets a cache miss count associated with the sequence number s as n, and sets a call path associated with the sequence number s as callpath (operation S23).

The profile information creating unit 14 determines whether cachemiss[callpath] has been defined (operation S24) and, if not defined, initializes cachemiss[callpath] at 0 (operation S25). Here, cachemiss is an array of cache miss counts, and callpath is taken as an index.

The profile information creating unit 14 adds n to cachemiss[callpath], adds 1 to s (operation S26), and the process returns to operation S22, where "x+=n" represents that n is added to x.

At operation S22, when s is not equal to or smaller than the maximum value of the sequence number, the profile information creating unit 14 outputs, for all callpath, callpath and cachemiss[callpath] in association with each other (operation S27).

FIG. 17 depicts an example of a cache miss count for each call path. In FIG. 17, the cache miss count for each call path created by the profile information creating unit 14 is depicted based on the cache miss count for each sequence number depicted in FIG. 10 and the call path for each sequence number depicted in FIG. 11. As depicted in FIG. 17, cache miss counts are aggregated for two call paths. For example, the cache miss count when function D calls function B and function B calls function A is a total of cache miss counts with sequence numbers of 1, 3, and 5, that is, 10+0+10=20.

In this manner, by totalizing cache miss counts associated with the sequence number for each call path, the profile information creating unit 14 may create information about the cache miss count for each call path.

Figure 18:
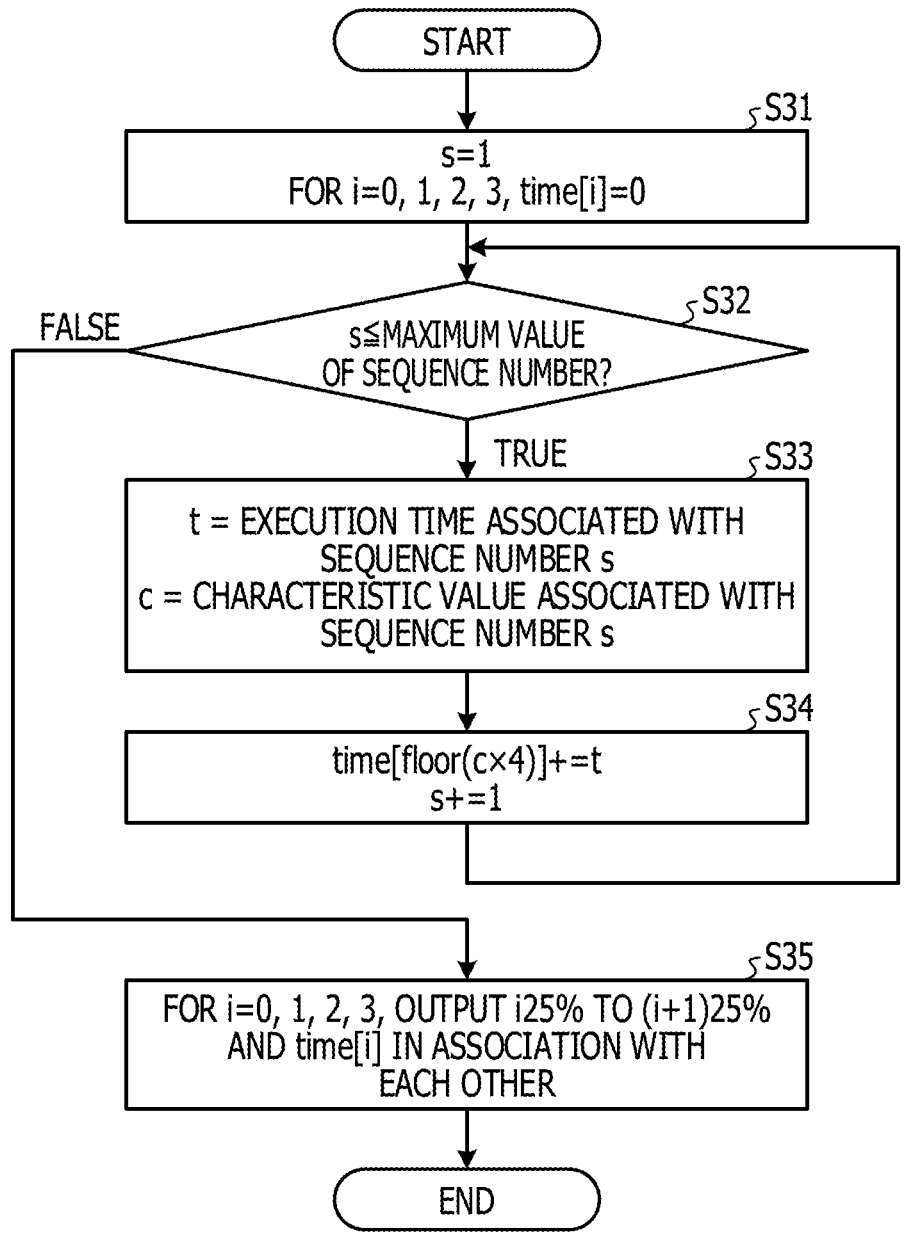
FIG. 18 depicts an example of aggregating process for total execution time.

FIG. 18 depicts an example of aggregating process for total execution time. In FIG. 18, aggregation is performed for total execution time for each section obtained by dividing the characteristic value of the array into four sections. As depicted in FIG. 18, the profile information creating unit 14 initializes s indicating a sequence number during process with 1, and initializes each element of time, which is an array for storing the execution times for four sections of the characteristic value of the array, at 0 (operation S31), where i is an index indicating a section. The profile information creating unit 14 determines whether s is equal to or smaller than the maximum value of the sequence number (operation S32).

When s is equal to or smaller than the maximum value of the sequence number, the profile information creating unit 14 takes execution time associated with the sequence number s as t, and takes a characteristic value associated with the sequence number s as c (operation S33).

The profile information creating unit 14 adds t to the value of time of a section associated with c, and adds 1 to s (operation S34), where "floor(x)" is a floor function for computing, for a real number x, a maximum integer equal to or smaller than x. The process then returns to operation S32.

At operation S32, when s is not equal to or smaller than the maximum value of the sequence number, the profile information creating unit 14 outputs each of the four sections and execution time in association with each other (operation S35).

FIG. 19 depicts an example of the execution time for each characteristic value section. In FIG. 19, an example of the execution time for each characteristic value section created by the profile information creating unit 14 is depicted based on the execution time for each sequence number depicted in FIG. 12 and the array characteristic value for each sequence number depicted in FIG. 13. As depicted in FIG. 19, aggregation is performed for execution times for four sections. For example, when the characteristic value section is equal to or larger than 0 and smaller than 25%, the execution time is a total of execution times of sequence numbers of 1 and 6, that is, 10+20=30.

In this manner, by totalizing execution times associated with sequence numbers for each characteristic value section, the profile information creating unit 14 may create information about execution time for each characteristic value section.

The read unit 15 of the profile information creating unit 14 reads the performance profile information 8 and the context information 9, and the aggregating unit 16 aggregates the performance profile information 8 for each context, thereby creating the context-specific performance profile information 10. The output unit 17 outputs the context-specific performance profile information 10. Since the performance information generating unit is creates the context-specific profile information 10 by creating the performance profile information 8 and the context information 9 separately, degradation of accuracy of the performance profile information may be decreased.

The executing unit 13 creates the performance profile information 8 and the context information 9 in association with the sequence number, and the aggregating unit 16 combines the performance profile information 8 and the context information 9 based on the sequence number, thereby creating the context-specific performance profile information 10. In this manner, the performance information generating unit is may create the performance profile information 8 and the context information 9 separately.

The read unit 15 reads information about the cache miss count as the performance profile information 8, and reads information about the call path as the context information 9. In this manner, the performance information generating unit is may create information about the cache miss count for each call path as an example of the context-specific performance profile information 10.

The read unit 15 reads information about execution time as the performance profile information 8, and reads the characteristic value of the array as the context information 9. In this manner, the performance information generating unit is may create information about execution time for each characteristic value section as an example of the context-specific performance profile information 10.

The code creating unit 11 receives an input of the source code 2 and creates the performance profile collection code 4 and the context collection code 5. With the performance profile collection code 4 and the context collection code 5 executed by the executing unit 13, the performance profile information 8 and the context information 9 are created, respectively. An engineer for performance tuning may easily obtain the context-specific performance profile information 10.

With the structure included in the performance information generating unit is executed by software, a performance information generation program with a similar function may be obtained.

Figure 20:
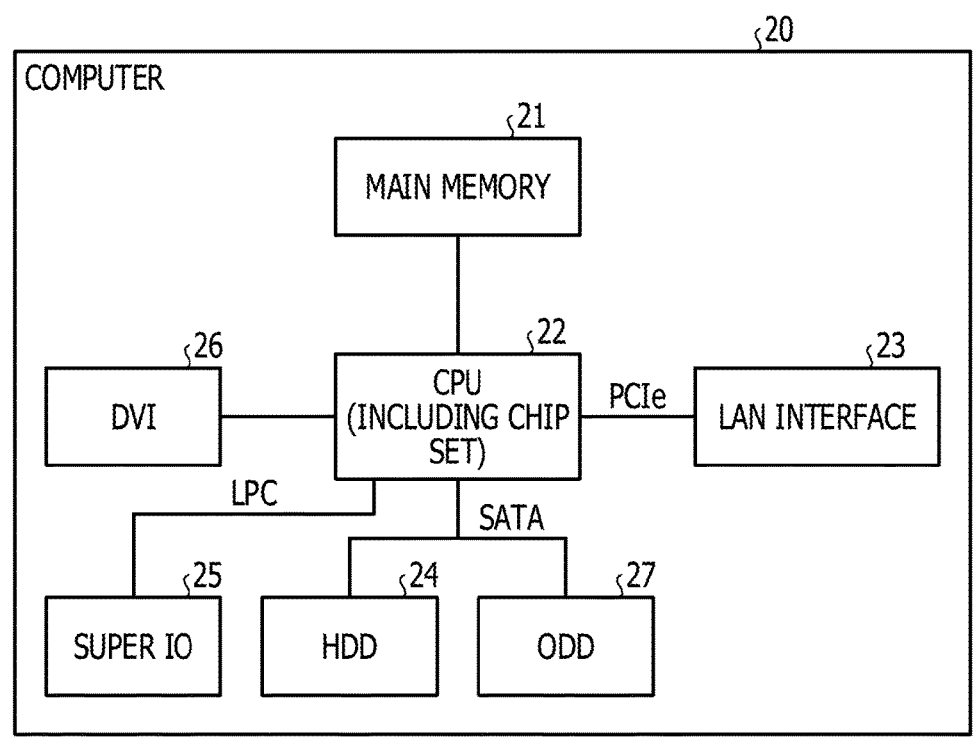
FIG. 20 depicts an example of a computer.

FIG. 20 depicts an example of a computer. By the computer depicted in FIG. 20, the performance information generation program described above may be executed. As depicted in FIG. 20, a computer 20 has a main memory 21, a central processing unit (CPU) 22, a local area network (LAN) interface 23, and a hard disk drive (HDD) 24. Also, the computer 20 has a super input output (IO) 25, a digital visual interface (DVI) 26, and an optical disk drive (ODD) 27.

The main memory 21 is a memory for storing a program, an execution progress result of the program, and so forth. The CPU 22 is a central processing unit which reads the program from the main memory 21 for execution. The CPU 22 includes a chip set having a memory controller.

The LAN interface 23 is an interface for connecting the computer 20 to another computer via a LAN. The HDD 24 is a disk device for storing a program and data, and the super IO 25 is an interface for connecting an input device such as a mouse and keyboard. The DVI 26 is an interface for connecting a liquid-crystal display device, and the ODD 27 is a device for reading and writing a DVD.

The LAN interface 23 is connected to the CPU 22 via PCI express (PCIe), and the HDD 24 and the ODD 27 are connected to the CPU 22 via serial advanced technology attachment (SATA). The super IO 25 is connected to the CPU 22 via low pin count (LPC).

For example, the performance information generation program to be executed in the computer 20 may be stored in a DVD, and may be read by the ODD 27 from the DVD and installed onto the computer 20. For example, the performance information generation program may be stored in a database of another computer system connected via the LAN interface 23, and may be read from the database and installed onto the computer 20. The installed performance information generation program may be stored in the HDD 24, may be read to the main memory 21, and may be executed by the CPU 22.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A performance information generating method, the method comprising:
acquiring a source code and a range which specifies a target source code in the source code;
generating, by a computer, a performance profile collection code by embedding a code which collects cache miss counts in association with sequence numbers into before and after the target source code and a context collection code by embedding a code which collects call paths in association with the sequence numbers into before and after the target source code;
executing the performance profile collection code and the context collection code independently to acquire context information in which respective call paths are associated with respective sequence numbers and performance profile information in which respective cache miss counts are associated with the respective sequence numbers independently;

aggregating the cache miss counts for each of the call paths using the sequence numbers based on the context information and the performance profile information;
outputting the performance profile information including the cache miss counts each aggregated for the respective call paths to perform a performance tuning of a target program; and
acquiring a total cache miss count of the respective call paths by adding one or more cache miss counts which correspond to one or more sequence numbers which are associated with the respective call paths and is included in the outputted performance profile information.

2. The performance information generating method according to claim 1, wherein the aggregating aggregates the performance profile information for each context by combining the context information and the performance profile information based on the sequence numbers.

3. The performance information generating method according to claim 1, further comprising compiling the performance profile collection code and the context collection code independently before executing the performance profile collection code and the context collection code independently.

4. An information processing apparatus comprising:
a memory configured to store a program; and
a processor configured to execute the program,
the processor, based on the program, is configured to:
acquire a source code and a range which specifies a target source code in the source code;
generate a performance profile collection code by embedding a code which collects cache miss counts in association with sequence numbers into before and after the target source code and a context collection code by embedding a code which collects call paths in association with the sequence numbers into before and after the target source code;
execute the performance profile collection code and the context collection code independently to acquire context information in which respective call paths are associated with respective sequence numbers and performance profile information in which respective cache miss counts are associated with the respective sequence numbers independently;
aggregate the cache miss counts for each of the call paths using the sequence numbers based on the context information and the performance profile information;
output the performance profile information including the cache miss counts each aggregated for the respective call paths to perform a performance tuning of a target program; and
acquire a total cache miss count of the respective call paths by adding one or more cache miss counts which correspond to one or more sequence numbers which are associated with the respective call paths and is included in the outputted performance profile information.

5. The information processing apparatus according to claim 4, wherein a process to aggregate the performance profile information for each context by combining the context information and the performance profile information based on the sequence numbers.

6. The information processing apparatus according to claim 4, wherein the performance profile collection code and the context collection code are compiled independently before executing the performance profile collection code and the context collection code independently.

7. A non-transitory computer-readable storage medium storing a performance information generation program to be executed by a computer, the performance information generation program causing the computer to:
acquire a source code and a range which specifies a target source code in the source code;
generate a performance profile collection code by bedding a code which collects cache miss counts in association with sequence numbers into before and after the target source code and a context collection code by embedding a code which collects call paths in association with the sequence numbers before and after the target source code;
execute the performance profile collection code and the context collection code independently to acquire context information in which respective call paths are associated with respective sequence numbers and performance profile information in which respective cache miss counts are associated with the respective sequence numbers independently;
aggregate the cache miss counts for each of the call paths using the sequence numbers based on the context information and the performance profile information;
output the performance profile information including the cache miss counts each aggregated for the respective call paths to perform a performance tuning of a target program; and
acquire a total cache miss count of the respective call paths by adding one or more cache miss counts correspond to one or more sequence numbers which are associated with the respective call paths and is included in the outputted performance profile information.

8. The non-transitory computer-readable storage medium according to claim 7, wherein a process to aggregate the performance profile information for each context by combining the context information and the performance profile information based on the sequence numbers.

9. The non-transitory computer-readable storage medium according to claim 7, wherein the performance profile collection code and the context collection code are compiled independently before executing the performance profile collection code and the context collection code independently.

10. A performance information generating method, the method comprising:
acquiring a source code and a range which specifies a target source code in the source code;
generating, by a computer, a performance profile collection code by embedding a code which collects execution times in association with sequence numbers into before and after the target source code and a context collection code by embedding a code which collects characteristic values for an array, which are obtained by accessing all elements of the array, in association with the sequence numbers into before and after the target source code;
executing the performance profile collection code and the context collection code independently to acquire context information in which respective characteristic values for an array are associated with respective sequence numbers and performance profile information in which respective execution times are associated with the respective sequence numbers independently;
aggregating the execution times for each of the characteristic values for the array using the sequence numbers based on the context information and the performance profile information;

outputting the performance profile information including the execution times each aggregated for the respective characteristic values for the array to perform a performance tuning of a target program; and acquiring a total execution time of a section including one or more characteristic values by adding one or more execution times which correspond to one or more sequence numbers which are associated with the one or more characteristic values and is included in the outputted performance profile information.

11. The performance information generating method according to claim 10, wherein the aggregating aggregates the performance profile information for each context by combining the context information and the performance profile information based on the sequence numbers.

12. The performance information generating method according to claim 10, further comprising compiling the performance profile collection code and the context collection code independently before executing the performance profile collection code and the context collection code independently.

13. An information processing apparatus comprising:
a memory configured to store a program; and
a processor configured to execute the program,
the processor, based on the program, is configured to:
   acquire a source code and a range which specifies a target source code in the source code;
   generate a performance profile collection code by embedding a code which collects execution times in association with sequence numbers into before and after the target source code and a context collection code by embedding a code which collects characteristic values for an array, which are obtained by accessing all elements of the array, in association with the sequence numbers into before and after the target source code;
   execute the performance profile collection code and the context collection code independently to acquire context information in which respective characteristic values for an array are associated with respective sequence numbers and performance profile information in which respective execution times are associated with the respective sequence numbers;
   aggregate the execution times for each of the characteristic values for the array using the sequence numbers based on the context information and the performance profile information;
   output the performance profile information including the execution times each aggregated for the respective characteristic values for the array to perform a performance tuning of a target program; and
   acquire a total execution time of a section including one or more characteristic values by adding one or more execution times which correspond to one or more sequence numbers which are associated with the one or more characteristic values and is included in the outputted performance profile information.

14. The information processing apparatus according to claim 13, wherein a process to aggregate aggregates the performance profile information for each context by combining the context information and the performance profile information based on the sequence numbers.

15. The information processing apparatus according to claim 13, wherein the performance profile collection code and the context collection code are compiled independently before executing the performance profile collection code and the context collection code independently.

16. A non-transitory computer-readable storage medium storing a performance information generation program to be executed by a computer, the performance information generation program causing the computer to:
   acquire a source code and a range which specifies a target source code in the source code;
   generate a performance profile collection code by embedding a code which collects execution times in association with sequence numbers into before and after the target source code and a context collection code by embedding a code which collects characteristic values for an array, which are obtained by accessing all elements of the array, in association with the sequence numbers into before and after the target source code;
   execute the performance profile collection code and the context collection code independently to acquire context information in which respective characteristic values for an array are associated with respective sequence numbers and performance profile information in which respective execution times are associated with the respective sequence numbers;
   aggregate the execution times for each of the characteristic values for the array using the sequence numbers based on the context information and the performance profile information;
   output the performance profile information including the execution times each aggregated for the respective characteristic values for the array to perform a performance tuning of a target program; and
   acquire a total execution time of a section including one or more characteristic values by adding one or more execution times which correspond to one or more sequence numbers which are associated with the one or more characteristic values and is included in the outputted performance profile information.

17. The non-transitory computer-readable storage medium according to claim 16, wherein a process to aggregate aggregates the performance profile information for each context by combining the context information and the performance profile information based on the sequence numbers.

18. The non-transitory computer-readable storage medium according to claim 16, wherein the performance profile collection code and the context collection code are compiled independently before executing the performance profile collection code and the context collection code independently.

* * * * *